(12) United States Patent
Wawrowski et al.

(10) Patent No.: US 9,521,534 B2
(45) Date of Patent: Dec. 13, 2016

(54) METHOD OF AND SYSTEM FOR CONTROLLING COMMUNICATIONS BETWEEN A PERSONAL COMMUNICATIONS DEVICE AND A PUBLIC SAFETY NETWORK IN AN EMERGENCY

(71) Applicant: MOTOROLA SOLUTIONS, INC., Schaumburg, IL (US)

(72) Inventors: Mariusz R. Wawrowski, Wawrzenczyce (PL); Kenneth W. Douros, South Barrington, IL (US); Michal Szychowski, Kraków (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 14/913,018

(22) PCT Filed: Aug. 23, 2013

(86) PCT No.: PCT/PL2013/000108
§ 371 (c)(1),
(2) Date: Feb. 19, 2016

(87) PCT Pub. No.: WO2015/026247
PCT Pub. Date: Feb. 26, 2015

(65) Prior Publication Data
US 2016/0205524 A1    Jul. 14, 2016

(51) Int. Cl.
*H04M 11/00* (2006.01)
*H04W 4/22* (2009.01)
(Continued)

(52) U.S. Cl.
CPC .............. *H04W 4/22* (2013.01); *H04W 4/001* (2013.01); *H04W 88/16* (2013.01)

(58) Field of Classification Search
CPC ......... H04W 4/001; H04W 4/22; H04W 88/16
(Continued)

(56) References Cited

U.S. PATENT DOCUMENTS 5,064,896 A    11/1991 Bell et al.
6,240,285 B1   5/2001 Blum et al.
(Continued)

FOREIGN PATENT DOCUMENTS

WO    2009088942    7/2009

OTHER PUBLICATIONS

Emergensee Personal Security System, "Government Agencies & Municipalities," website, May 17, 2013 (pp. 1-2).
(Continued)

*Primary Examiner* — Charles Shedrick
(74) *Attorney, Agent, or Firm* — Daniel R. Bestor (57) ABSTRACT

In an emergency, a gateway application, which has been installed on a mobile communications device, is actuated to advise a public safety answering point (PSAP) in a public safety (PS) network of the emergency, and to disable restrictions on application downloading to the mobile device. Once the emergency has been confirmed by the PSAP, an emergency application, which has been selected by the PSAP, is downloaded to the mobile device. The downloaded emergency application can be executed by the PSAP and/or by a PS person, to remotely control the mobile device to help remedy the emergency. The downloaded emergency application can be removed from the mobile device upon closing of the emergency.

16 Claims, 4 Drawing Sheets

(51) Int. Cl.
*H04W 4/00* (2009.01)
*H04W 88/16* (2009.01)

(58) Field of Classification Search
USPC .......................................... 455/404.1, 404.2
See application file for complete search history.

(56) References Cited

U.S. PATENT DOCUMENTS

| | | | |
|---|---|---|---|
| 7,496,182 | B2 | 2/2009 | Coster et al. |
| 7,796,557 | B2 | 9/2010 | Xue et al. |
| 8,285,244 | B2 * | 10/2012 | Girard .................... H04M 11/04 379/37 |
| 8,315,598 | B2 | 11/2012 | Price |
| 9,380,144 | B1 * | 6/2016 | Kritt ................ H04M 1/72538 |
| 2002/0054667 | A1 | 5/2002 | Martinez |
| 2002/0128036 | A1 | 9/2002 | Yach et al. |
| 2005/0213716 | A1 | 9/2005 | Zhu et al. |
| 2005/0265326 | A1 | 12/2005 | Laliberte |
| 2006/0009190 | A1 | 1/2006 | Laliberte |
| 2006/0128355 | A1 | 6/2006 | Aaron |
| 2007/0123223 | A1 | 5/2007 | Letourneau |
| 2007/0254625 | A1 | 11/2007 | Edge |
| 2008/0171533 | A1 | 7/2008 | Sharp et al. |
| 2010/0124900 | A1 | 5/2010 | Lui et al. |
| 2010/0202368 | A1 | 8/2010 | Hans |
| 2010/0279648 | A1 | 11/2010 | Song et al. |
| 2010/0317317 | A1 | 12/2010 | Maier |
| 2011/0086607 | A1 | 4/2011 | Wang |
| 2011/0230162 | A1 | 9/2011 | Mutikainen |
| 2011/0237217 | A1 | 9/2011 | Monks et al. |
| 2011/0237287 | A1 | 9/2011 | Klein et al. |
| 2012/0329420 | A1 * | 12/2012 | Zotti ................. H04M 1/72541 455/404.2 |
| 2013/0040600 | A1 | 2/2013 | Reitnour |
| 2013/0072144 | A1 | 3/2013 | Berger et al. |
| 2013/0183924 | A1 | 7/2013 | Saigh |
| 2014/0266585 | A1 * | 9/2014 | Chao ................... G07C 9/00111 340/5.61 |
| 2015/0317809 | A1 * | 11/2015 | Chellappan ........... G06T 11/206 455/404.1 |

OTHER PUBLICATIONS

Emergensee Personal Security System, "How it works," user manual, May 17, 2013 (pp. 1-5).
Baths, David, "Emergency, 911 Systems Upgrade to Accept Text Messages and Video," article, Aug. 4, 2008 (pp. 1-5).
Federal Communications Commission, "Emergency Communications," guide (2009) first known to us Jun. 4, 2013 (pp. 1-4).
Moore, Linda K., "Emergency Communications: The Future of 911," CRS report for congress, Jun. 16, 2009, (pp. 1-34).
androidforums.com, "Any way to Enter emergency callback mode without calling 911," first known to us Jun. 4, 2013 (pp. 1-8).
PCT/PL2013/000108 International Search Report and Written Opinion dated May 15, 2014 (10 pages).

* cited by examiner

METHOD OF AND SYSTEM FOR CONTROLLING COMMUNICATIONS BETWEEN A PERSONAL COMMUNICATIONS DEVICE AND A PUBLIC SAFETY NETWORK IN AN EMERGENCY

This application is a National Stage filing under 35 USC §371 of co-pending Patent Cooperation Treaty international application having Serial No. PCT/PL2013/000108 (the 'PCT international application') filed on Aug. 23, 2013. This application claims priority to the PCT international application, the entire contents of which are incorporated herein by reference.

FIELD OF THE DISCLOSURE

The present disclosure relates generally to a method of, and a system for, controlling communications between a personal mobile communications device, such as a smartphone, and a public safety (PS) network in an emergency, and, more particularly, to enable a public safety answering point (PSAP) and/or a public safety (PS) person, such as a first responder having a PS communications device, such as a land mobile radio, operative over the PS network, to remotely control the mobile communications device to help remedy the emergency.

BACKGROUND

In an emergency, it is known for a person to make an emergency telephone call with a personal mobile communications device, such as a cellular phone or a smartphone, by entering a predetermined sequence of numbers, e.g., 9-1-1 in the United States and Canada, or 1-1-2 in the European Union, on the mobile device. The mobile device typically operates over a public carrier communications network, and typically with a wireless, broadband, high-speed connection. Only minimal data is typically delivered with this emergency call, such as automatic number identification, subscriber name, and automatic location identification, e.g., global positioning satellite (GPS) coordinates, when available, to a public safety answering point (PSAP), also known as a call center. When deemed necessary, the call center, in turn, typically dispatches public safety (PS) personnel, such as police officers, firefighters, paramedics, emergency medical service technicians, disaster relief workers, military rescue personnel, and like first responders, to the incident scene to respond to remedy the emergency. These PS personnel typically utilize PS communication devices, both handheld and vehicle-portable, while working in the field. PS communication devices include, for example, land mobile radios (LMRs), such as handheld radios and/or vehicular radios, along with remote accessories, such as remote microphones, speakers, earpieces, headsets, and the like, as well as PS or non-PS smartphones, to support wireless voice communications. These primary, mission-critical PS devices and the infrastructure to support their operation are typically operated via a private, secure, and protected, proprietary PS network governed by a PS agency, e.g., a local government or department.

To improve public emergency communications services in a wireless mobile society, the art has proposed a Next Generation 9-1-1 (NG 9-1-1) environment, in which a person will be able to make a voice, text, still image, moving image (video), and data emergency call from any communications device via an Internet Protocol-based network. The NG 9-1-1 environment is not yet fully implemented, but the call center of the future is expected to receive the call and to dispatch PS personnel to the incident scene of the emergency, in a manner similar to current procedures.

As advantageous as the known public emergency communications services have been, there are circumstances where a more expedited and effective resolution of the emergency is needed. For example, during an emergency, especially of long duration, it is possible that battery power to the mobile device will drain completely, thereby thwarting further communications between the mobile device and the call center. As another example, a user of the mobile device may be unable during an emergency to activate one or more of the on-board sensors, which include an accelerometer, a compass, a gyroscope, a GPS sensor, a camera, a microphone, a barometer, a proximity sensor, a temperature sensor, an ambient light sensor, and like sensors. Sometimes, the user may have deliberately disabled one of these sensors, e.g., the GPS sensor, the camera, or the microphone, thereby making the disabled sensor unavailable during the emergency. As still another example, direct communication between the PS person at the incident scene and the mobile device would be of immense benefit during the emergency, but such communication is currently unavailable.

Accordingly, there is a need for an improved public emergency communications service system and method that will alleviate the aforementioned problems and enable a more expedited and more effective resolution of an emergency.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions and locations of some of the elements in the figures may be exaggerated relative to other elements to help to improve understanding of embodiments of the present invention.

The method and system components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

One aspect of this disclosure relates to a method of controlling communications between a personal mobile communications device and a public safety (PS) network in an emergency. The method is performed by installing a gateway application on the mobile device. The gateway application may be pre-installed on the mobile device by its manufacturer/supplier, or a user may download and install the gateway application after purchase of the mobile device. In the event of an emergency, the gateway application is actuated. This can be accomplished, for example, by actuating a predetermined emergency sequence of number keys, e.g., actuating the number keys 9-1-1 on the mobile device, or by actuating a dedicated button/key/icon on the mobile device. Actuating the gateway application causes a public safety answering point (PSAP), i.e., a call center, in the PS network to be contacted and advised of the emergency, and also disables restrictions on application downloading to the mobile device. For example, most manufacturers of mobile devices require entry of a password, or performance of another authentication factor, to permit an application to be downloaded onto a mobile device. The gateway application may also advise the PSAP of the capabilities of the mobile device, e.g., if the mobile device has a temperature sensor.

Next, the PSAP confirms the emergency and advantageously selects a particular emergency application from among a plurality of emergency applications. For example, one type of emergency application may be suitable for a fire emergency, while a different emergency application may be suitable for a flood emergency. The selection advantageously takes into account the capabilities of the mobile device. The selected emergency application is then downloaded to the mobile device. Executing the downloaded emergency application enables the mobile device to now be remotely controlled during the emergency. The remote control can, for example, be performed by the PSAP, or by a PS person dispatched by the PSAP over a responder communications device.

The PSAP and/or the PS person can remotely change one or more operational settings of a hardware component and/or a software component of the mobile device. For example, power consumption can be managed to prevent the battery of the mobile device from draining completely. Any one or more of the on-board sensors can be remotely activated, which is especially useful if the user of the mobile device is unable to do so. A deliberately disabled one of these sensors, e.g., the GPS sensor, the camera, or the microphone, can now be remotely re-enabled.

The PSAP can also close the emergency, in which case, the downloaded emergency application is automatically removed from the mobile device. Communication of voice, and/or text, and/or still images, and/or moving images, and/or data occurs in real time over an open, bidirectional, wireless channel between the mobile device and the PS network.

A system, in accordance with another aspect of this disclosure, is operative for controlling communications between a personal mobile communications device and a public safety (PS) network in an emergency. The system includes an actuatable gateway application installed on the mobile communications device, the gateway application being operative for disabling restrictions on application downloading to the mobile communications device upon actuation of the gateway application; a public safety answering point (PSAP) in the PS network, the PSAP being advised of the emergency upon actuation of the gateway application, and being operative for confirming the emergency; and an application server for downloading an emergency application to the mobile communications device upon confirmation of the emergency by the PSAP, the downloaded emergency application being operative for enabling remote control of the mobile communications device during the emergency.

Figure 1:
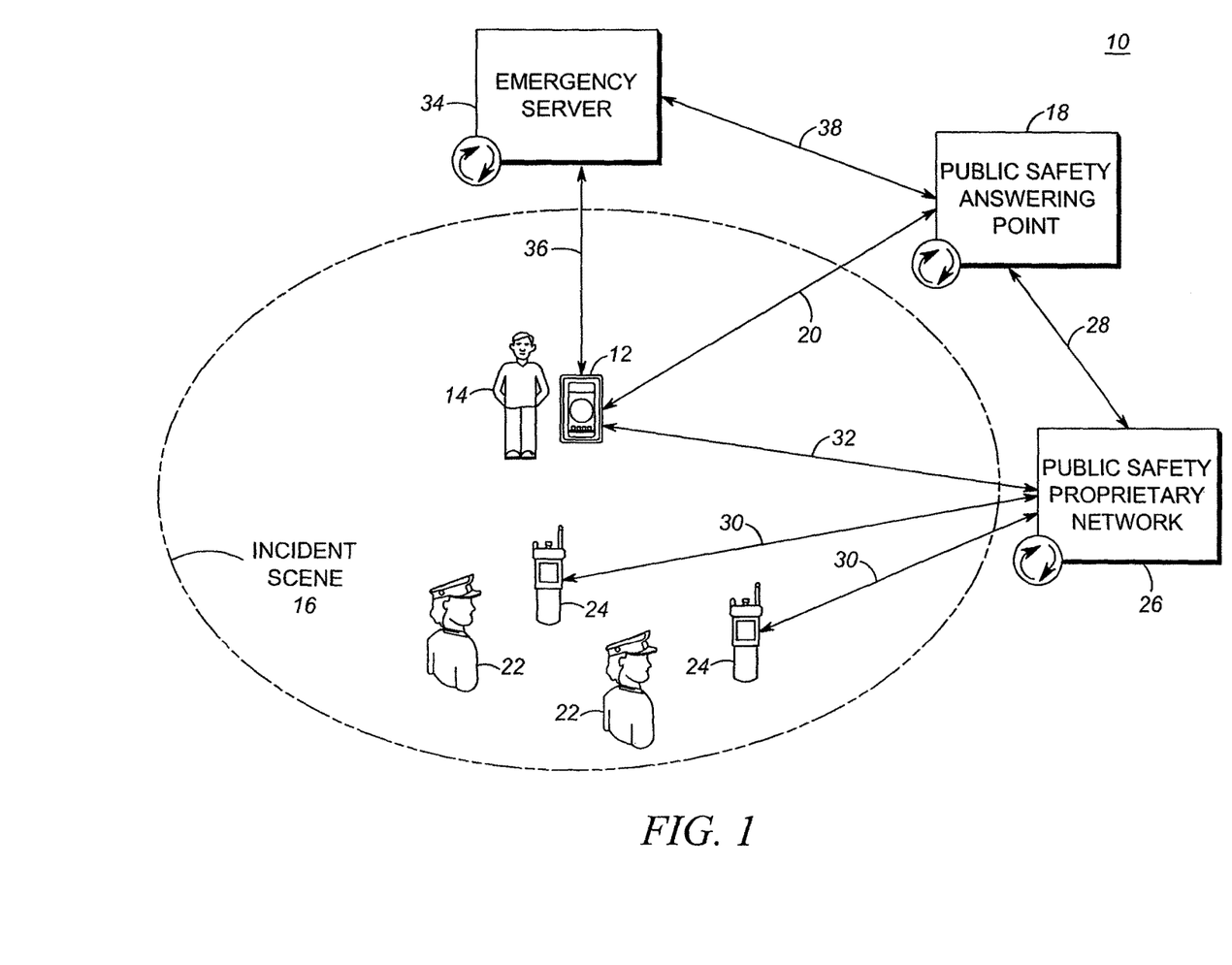
FIG. 1 is a pictorial, schematic view of a system for controlling communications between a personal mobile communications device and a PS network in an emergency in accordance with the present disclosure.

Turning now to the drawings, reference numeral 10 in FIG. 1 generally identifies a system operative for controlling communications between a personal mobile communications device, such as a cellular telephone or a smartphone 12, and a public safety (PS) network, as detailed below, in an emergency. The mobile device 12 is operated by a person 14 who may be a victim of, or threatened by, the emergency at an incident scene 16, or may be another person that is reporting the emergency on behalf of the victim or threatened person. Although only one mobile device 12 is depicted in FIG. 1, it will be understood that many mobile devices may be involved in the emergency and its reporting. The mobile device 12 has a keyboard (real or electronic); one or more on-board sensors, such as an accelerometer, a compass, a gyroscope, a GPS sensor, a camera, a microphone, a barometer, a proximity sensor, a temperature sensor, an ambient light sensor, and the like; an on-board memory and microprocessor for storing and running applications and a mobile operating system; a display screen for displaying icons indicative of the applications, number keys, and the like; and radio frequency (RF) transceivers for communicating with the PS network over bi-directional wireless links. Commercial examples of the mobile device 12 are Android (trademark) phones and iPhones (trademark).

In an emergency, the person 14 enters a predetermined sequence of numbers, e.g., 9-1-1 in the United States and Canada, or 1-1-2 in the European Union, on the mobile device 12 to contact a public safety answering point (PSAP) 18, also known as a call center, manned by operators, over a bidirectional wireless link 20. When deemed necessary, the PSAP, in turn, communicates with a proprietary PS network 26 over a bidirectional wireless link 28, and dispatches public safety (PS) personnel 22, such as police officers, firefighters, paramedics, emergency medical service technicians, disaster relief workers, military rescue personnel, and like first responders, to the incident scene 16 to respond to remedy the emergency. These PS personnel 22 typically utilize PS communication devices 24, both handheld and vehicle-portable, while working in the field. PS devices 24 include, for example, land mobile radios (LMRs), such as handheld radios and/or vehicular radios, along with remote accessories, such as remote microphones, speakers, earpieces, headsets, and the like, as well as PS or non-PS smartphones, to support wireless voice and data communications. These primary, mission-critical PS devices and the infrastructure to support their operation are typically operated over the private, secure, and protected, proprietary PS network 26 governed by a PS agency, e.g., a local government or department, over bidirectional wireless links 30.

As described below, the proprietary PS network 26 communicates with the mobile device 12 over a bidirectional wireless link 30. In addition, an emergency server 34, as described below, communicates with the mobile device 12 over a bidirectional wireless link 36, and with the PSAP 18 over a bidirectional wireless link 38. The wireless links 20, 28, 30, 32, 36, 38, as described in further detail below, may operate under the Wi-Fi, 2G, 3G, 4G, or long-term evolution (LTE), standard, and like standards, all of which are open protocols for wireless transmission of voice and data.

Figure 2:
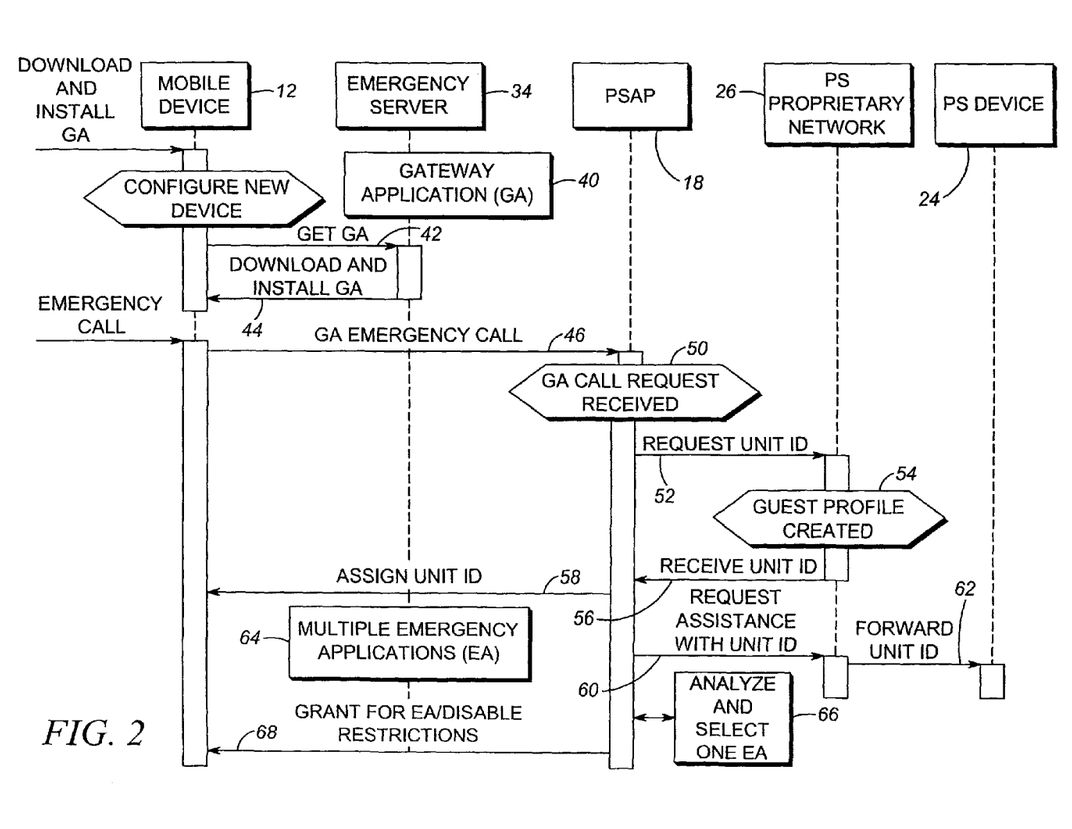
FIG. 2 is an action sequence chart, wherein various initial actions of the components of the system of FIG. 1 are set forth in a timed sequence.

FIG. 2 is an action sequence chart, with the mobile device 12, the emergency server 34, the PSAP 18, the PS proprietary network 26, and the PS device 24 arranged along a top row, and wherein their various functions are set forth vertically below in a timed sequence. In accordance with this disclosure, and as shown in FIG. 2, a gateway application (GA) 40 is installed on the mobile device 12, in advance of any future emergency. The gateway application 40 may be pre-installed on the mobile device 12 by its manufacturer/supplier, or the user 14 may download and install the gateway application after purchase of the mobile device 12 from the emergency server 34. More particularly, at step 42, the mobile device 12 gets the gateway application 40 from the emergency server 34, and, at step 44, the gateway application 40 is downloaded and installed on the mobile device 12. The emergency server 34 may be controlled by the PSAP 18, or it may be a server controlled by the manufacturer/supplier of the mobile device 12 and available for download at a public online applications store.

In the event of an emergency, the gateway application 40 is actuated. This can be accomplished, as described above, by actuating a predetermined emergency sequence of number keys, e.g., actuating the number keys 9-1-1 on the mobile device 12, or by actuating a dedicated button/key/icon on the mobile device 12 indicative of the gateway application 40. Actuating the gateway application 40 causes the PSAP 18 to be contacted and advised of the emergency at step 46. The gateway application 40 may also advise the PSAP 18 of the capabilities of the mobile device 12, e.g., if the mobile device 12 has a particular sensor.

The PSAP 18 receives the call at block 50, together with information concerning the capabilities of the mobile device 12, and confirms the emergency. A prank call will be disregarded, but a real call will be acted upon by requesting a Unit ID from the PS proprietary network 26 at step 52, creating a guest profile at step 54, receiving the Unit ID at the PSAP 18 at step 56, and forwarding the assigned Unit ID to the mobile device 12 at step 58. Once the Unit ID has been assigned to the mobile device 12, voice transmission is always enabled regardless of whether the mobile device 12 changes its wireless link to a different standard. Once the Unit ID has been assigned to the mobile device 12, the PSAP 18 assigns a PS person 22 by requesting assistance at step 60 from the proprietary network 26 that, in turn, forwards the request to the PS device 24 of the PS person 22 at step 62.

One or more emergency applications 64 (EAs) are stored on the emergency server 34. The PSAP 18 at block 66 selects a particular emergency application from among the plurality of emergency applications 64. For example, one type of emergency application may be suitable for a fire emergency, while a different emergency application may be suitable for a flood emergency. The selection advantageously takes into account the capabilities of the mobile device 12. Permission for the selected emergency application 64 to be downloaded to the mobile device 12 is performed at step 68, which also disables restrictions on application downloading to the mobile device 12. For example, most manufacturers of mobile devices 12 require entry of a password, or performance of another authentication factor, to permit an application to be downloaded onto the mobile devices 12. By disabling such a requirement, it allows the emergency application 64 to be automatically installed on the mobile device 12 as another response to actuating the gateway application 40.

Figure 3:
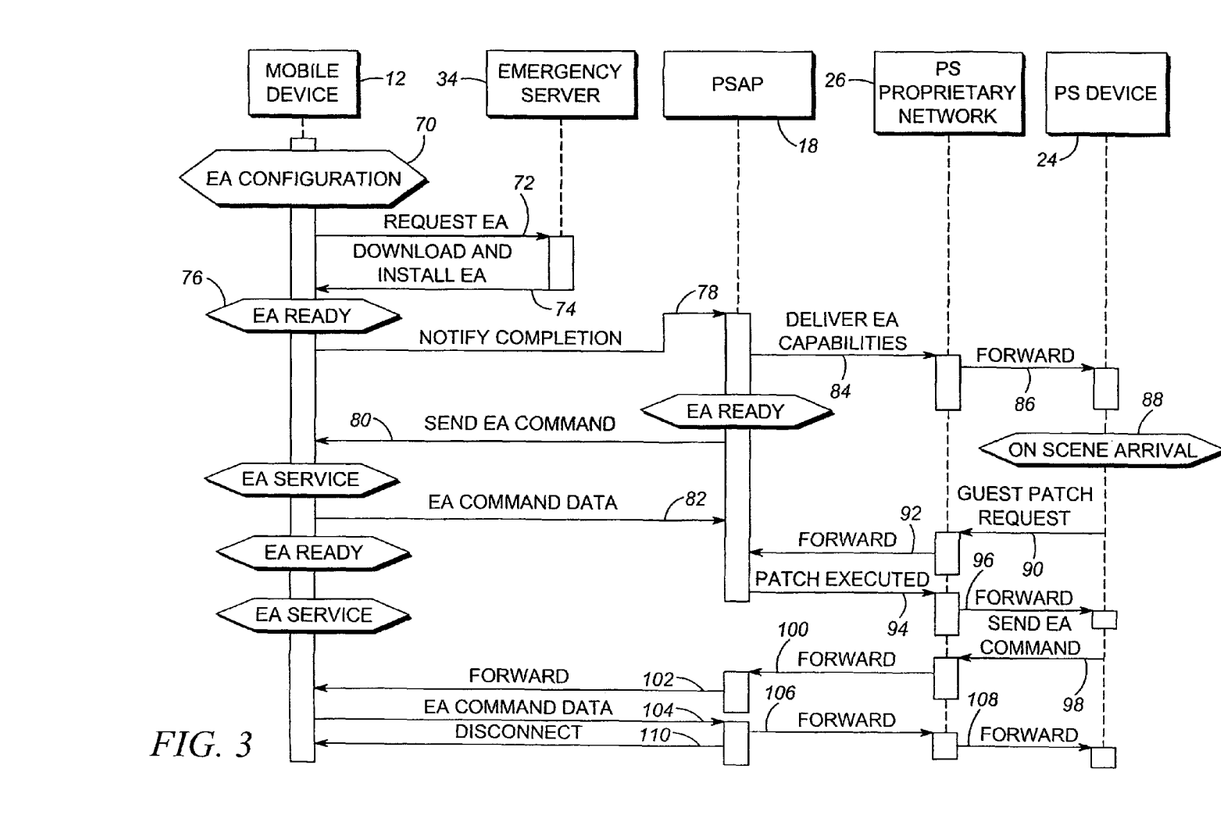
FIG. 3 is an action sequence chart, wherein various further actions of the components of the system of FIG. 1 are set forth in a timed sequence.

Turning now to FIG. 3, which is a continuation of the action sequence chart of FIG. 2, the mobile device 12 has been configured at block 70 to accept downloading of the emergency application 64. At step 72, the mobile device 12 requests that the emergency application 64 be delivered from the emergency server 34. At step 74, the selected emergency application 64 has been downloaded from the emergency server 34, and installed. The mobile device 12 is now ready to be remotely controlled ("EA Ready") at block 76 and notifies the PSAP 18 of its readiness at step 78.

Executing the downloaded emergency application 64 enables the mobile device 12 to now be remotely controlled by the PSAP 18 during the emergency. More particularly, the PSAP 18 sends one or more commands to the mobile device 12 at step 80, and the mobile device 12 sends responsive command data back to the PSAP 18 at step 82. The PSAP 18 can remotely change one or more operational settings of a hardware component and/or a software component of the mobile device 12. For example, power consumption can be managed to prevent the battery of the mobile device 12 from draining completely. Any one or more of the on-board sensors can be remotely activated, which is especially useful if the user 14 of the mobile device 12 is unable to do so. A deliberately disabled one of these sensors, e.g., the GPS sensor, the camera, or the microphone, can now be remotely re-enabled.

The PSAP 18 can also enable the PS person 22 to remotely control the mobile device 12 by delivering the EA capabilities to the PS proprietary network 26 at step 84, which, in turn, forwards the request to the PS device 24 operated by the dispatched PS person 22. Upon arrival at the incident scene 16 at block 88, a request to patch into the mobile device 12 is sent to the PS proprietary network 26 at step 90, which, in turn, is forwarded to the PSAP 18 at step 92. In response, the patch consent is sent from the PSAP 18 to the PS proprietary network 26 at step 94, which, in turn, is forwarded to the PS device 24 at step 96. Now, the PS device 24 sends one or more commands to the PS proprietary network 26 at step 98, which, in turn, forwards the commands to the PSAP 18 at step 100, which, in turn, forwards the commands to the mobile device 12 at step 102. The mobile device 12 sends responsive command data back to the PSAP 18 at step 104, which, in turn, forwards the command data to the PS proprietary network 26 at step 106, which, in turn, forwards the command data to the PS device 24 at step 108. The PS device 24 can remotely change one or more operational settings of a hardware component and/or a software component of the mobile device 12, as described above for the PSAP 18.

The PSAP 18 can also close the emergency by sending a disconnect command at step 110, in which case, the downloaded emergency application 64 is automatically removed from the mobile device 12. Communication of voice, and/or text, and/or still images, and/or moving images, and/or data between each component of the system 10 occurs in real time over open, bidirectional, wireless channels. Ad hoc networks can also be established at the incident scene 16.

Figure 4:
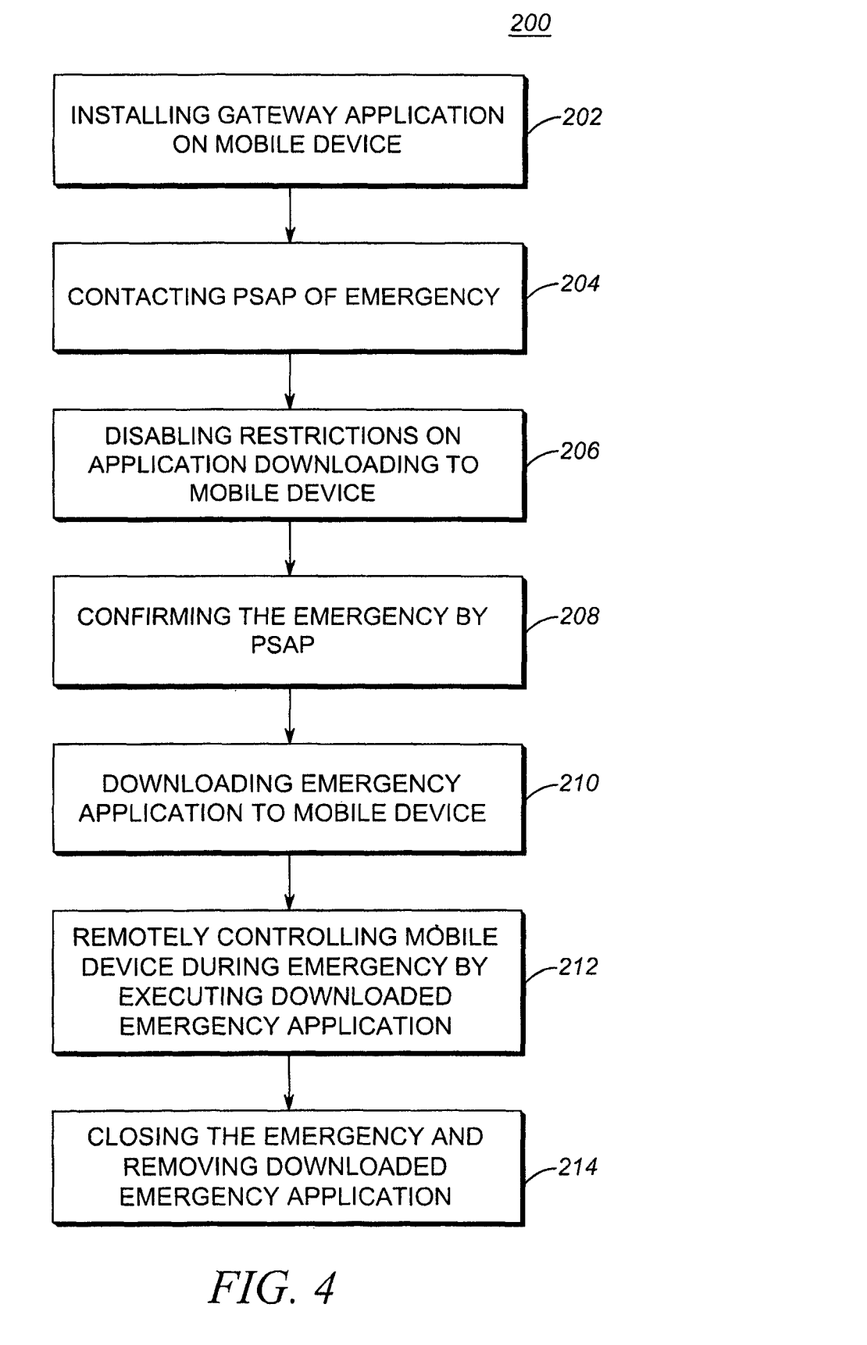
FIG. 4 is a flow chart depicting steps performed in accordance with a method in accordance with the present disclosure.

The flow chart 200 of FIG. 4 depicts the overall method of controlling communications between the mobile device 12 and the PS network in an emergency. The method is performed by installing the gateway application 40 on the mobile device 12 in step 202; contacting the PSAP 18 in the PS network of the emergency in step 204 by actuating the gateway application 40; disabling restrictions on application downloading to the mobile device 12 in step 204 by actuating the gateway application 40; confirming the emergency by the PSAP in step 208; downloading the emergency application 64 to the mobile device 12 upon confirmation of the emergency in step 210; and remotely controlling the mobile device 12 during the emergency by executing the downloaded emergency application 64 in step 212. The emergency is then closed, and the downloaded emergency application 64 is then automatically removed from the mobile device 12 in step 214.

As described above, the emergency application 64 is installed on the mobile device 12, and the PSAP 18 and/or the PS device 24 have temporary access to, and control of the mobile device 12. In a variant construction, the emergency application 64, or an equivalent permission token, can be downloaded from the emergency server 34 and be installed on the PS device 24. The PSAP 18 can then have temporary access to, and control of, the PS device 24, which is of especial benefit when the PS person 22 is out of action, i.e., in an "officer-down" scenario.

The wireless links 20, 28, 30, 32, 36, and 38 illustrated in FIG. 1 can be logical or physical. For example, link 32, in most instances, will be a logical link (simulated through links 20 and 28), because there is typically no wireless protocol in common between the mobile device 12 and the PS proprietary network 26. When using WiFi, or if the mobile device 12 is an LTE device, then link 32 could be a physical link since the mobile device 12 and the PS proprietary network 26 are on the same wireless technology. Over a traditional cellular network (e.g., today's 3G carrier standard), link 32 will only be a logical link. The system 10 needs to be aware of whether it can support a physical link (preferred) or only a logical link (more typical with today's technologies) on a call-by-call basis.

In most cases, the initial 9-1-1 emergency call over link 20 will be used to set up a logical connection between the mobile device 12 and the PS proprietary network 26, thereby permitting the exchange of voice and data. In cases where a physical link between the mobile device 12 and the PS proprietary network 26 can be supported, then the PSAP 18 may just hand off the call to the PS proprietary network 26, which will then directly communicate with the mobile device 12 via the link 32. In cases where a physical link is possible, the PSAP 18 no longer needs to be part of the communication channel, and the PS proprietary network 26 can control the mobile device 12 directly. In practice, the PSAP 18 will likely stay in communication with the mobile device 12, even where a physical link 32 exists. Where the link 32 can only be a logical link, then the links 20 and 28 must remain open. If the PSAP 18 does go out-of-the-loop, then there may need to be a direct connection between the PS proprietary network 26 and the emergency server 34. There will be a gateway between the PSAP 18 and the PS proprietary network 26 to establish the connection with the mobile device 12.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements, but may include other elements not expressly listed or inherent to such process, method, article, or apparatus. An element proceeded by "comprises . . . a," "has . . . a," "includes . . . a," or "contains . . . a," does not, without more constraints, preclude the existence of additional identical elements in the process, method, article, or apparatus that comprises, has, includes, or contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1%, and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors, and field programmable gate arrays (FPGAs), and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein, will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

The invention claimed is:

1. A method of controlling communications between a personal mobile communications device and a public safety (PS) network in an emergency, the method comprising:
   operating a gateway application on the mobile communications device;
   contacting, by the mobile communications device, a public safety answering point (PSAP) in the PS network of the emergency, and disabling, by the mobile communications device, a restriction on application downloading at the mobile communications device;
   confirming, by the PSAP, the emergency and selecting, by the PSAP, a particular emergency application out of a plurality of available emergency applications, as a function of a type of the emergency;
   downloading, via an application server, the particular emergency application to the mobile communications device; and
   remotely controlling the mobile communications device during the emergency via the particular emergency application.

2. The method of claim 1, wherein the actuating of the gateway application is performed in response to actuating a predetermined emergency sequence of number keys on the mobile communications device associated with contacting the PSAP.

3. The method of claim 1, wherein the controlling is performed by remotely controlling an operational setting of at least one of a hardware component and a software component of the mobile communications device.

4. The method of claim 1, wherein the controlling is performed by the PSAP.

5. The method of claim 1, further comprising closing the emergency by the PSAP and responsively automatically removing, by the mobile communications device, the particular emergency application from the mobile communications device.

6. The method of claim 1, further comprising:
   requesting a unit identification (ID) from the PS network by the PSAP; and
   dispatching a PS person having a responder communications device with the unit ID to the emergency;
   wherein the controlling the mobile communications device during the emergency is performed by the responder communications device.

7. The method of claim 6, further comprising communicating at least one of voice, text, still images, moving images, and data in real time over an open, bidirectional, wireless channel between the mobile communications device and the responder communications device.

8. The method of claim 1, further comprising communicating at least one of voice, text, still images, moving images, and data in real time over an open, bidirectional, wireless channel between the mobile communications device and the PS network.

9. A system for controlling communications between a personal mobile communications device and a public safety (PS) network in an emergency, the system comprising:
   an actuatable gateway application installed on the mobile communications device, and operative for disabling restrictions on application downloading to the mobile communications device upon actuation of the gateway application;
   a public safety answering point (PSAP) in the PS network, and operative for being advised of the emergency upon actuation of the gateway application, for confirming the emergency, and for selecting a particular emergency application out of a plurality of available emergency applications as a function of a type of the emergency;
   an application server for downloading the particular emergency application to the mobile communications device; and
   the particular emergency application being operative for enabling remote control of the mobile communications device during the emergency.

10. The system of claim 9, wherein the mobile communications device has number keys, and wherein the gateway application is actuated in response to actuating a predetermined emergency sequence of the number keys associated with contacting the PSAP.

11. The system of claim 9, wherein the downloaded emergency application is operative for enabling the remote control of an operational setting of at least one of a hardware component and a software component of the mobile communications device.

12. The system of claim 9, wherein the PSAP is operative for remotely controlling the mobile communications device during the emergency.

13. The system of claim 9, wherein the PSAP is operative for closing the emergency, and wherein the mobile communications device is operative for automatically removing the downloaded emergency application from the mobile communications device upon the closing of the emergency.

14. The system of claim 9, wherein the PSAP is operative for requesting a unit identification (ID) from the PS network, and for dispatching a PS person having a responder communications device with the unit ID to the emergency; and wherein the responder communications device is operative for remotely controlling the mobile communications device during the emergency.

15. The system of claim 14, wherein the responder device and the mobile communications device communicate at least one of voice, text, still images, moving images, and data in real time over an open, bidirectional, wireless channel.

16. The system of claim 9, wherein the mobile communications device and the PS network communicate at least one of voice, text, still images, moving images, and data in real time over an open, bidirectional, wireless channel.

* * * * *